United States Patent Office 2,865,911
Patented Dec. 23, 1958

2,865,911
ESTERS AND THIOESTERS OF PENICILLIN AND THEIR PRODUCTION

Erling Juhl Nielsen, Charlottenlund, and Rudolf Reiter, Herlev, Denmark, assignors to Løvens Kemiske Fabrik ved A. Kongsted, Copenhagen, Denmark No Drawing. Application July 7, 1954
Serial No. 445,884

Claims priority, application Denmark August 20, 1953

7 Claims. (Cl. 260—239.1)

This invention relates to novel esters and thioesters of penicillin and to their production.

It is known that esters of penicillin with certain aminoalcohols have a therapeutic effect, particularly when used as soluble or difficultly soluble salts with appropriate organic or inorganic acids. As compared with common penicillin salts, the said ester salts are particularly advantageous in their ability to concentrate in certain body tissues, for example lung tissue. By using the difficultly soluble salts injected in a suitable manner, f. inst. intramuscularly, the antibiotic effect can be protracted. Examples of acids forming sparingly soluble salts with these basic esters are f. inst. hydrogen iodide and sulphanilic acid.

One object of the present invention is to provide novel penicillin compounds, which possess advantageous antibiotic properties. Although in many instances soluble in water, the compounds of the invention show a protracted antibiotic effect, and in some cases their ability of accumulating in specific tissues, e. g. the lungs, exceeds that of the known amino ester salts of penicillin. Also, the toxicity of our novel esters and salts compares favorably with that of the known esters and their salts.

Another object of the invention is to provide for novel aminoesters of penicillin which are less susceptible to enzymatic degradation of the penicillin by penicillinase.

Further objects of the invention will appear from the following, where a more detailed description of our invention is given together with results of biological testing of the compounds of the invention, and, further, the invention is illustrated by examples showing a convenient method of preparing said compounds, but it will be understood that our invention is not to be considered limited by such examples.

The novel penicillin esters of our invention may be isolated as the esters themselves, but are preferably isolated and used as salts with acids innocuous to human beings. Examples of suitable acids for use in forming salts with the present esters are: hydrochloric, hydrobromic and hydriodic acid, sulphuric acid, citric acid, lactic acid, benzene sulphonic acid, toluene sulphonic acid and penicillin. The novel esters themselves are usually viscous oils or amorphous powders, although they may in some cases be crystalline. The salts are crystalline or amorphous.

The compounds of the invention are esters of penicillin with phenols and thiophenols having a basic substituent, said esters being represented by the formula:

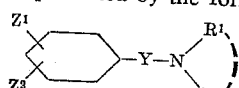

where $Z^1$ is from the class consisting of PenCOO and PenCOS, PenCO representing penicillin with hydroxyl removed from the carboxyl group; where $Z^2$ is from the class consisting of hydrogen and the groups represented by $Z^1$; where Y is from the class consisting of alkylene groups and alkylene groups linked to a carbon atom in the phenyl ring through a member of the class consisting of —O—, —S—, —NH—, —NR—, —RO—, —RS—, —CO—, —COO—, —CONH—, —CONR—, —COS—, —CSO—, —NHCO—, —NRCO—, —NHCS—, —NRCS—, —CSNH— and —CSNR— radicals, where R is a lower alkyl group; and where $R^1$ and $R^2$ are from the class consisting of alkyl groups of not more than 4 carbon atoms and alkylene groups forming a heterocyclic ring with the nitrogen atom.

While the preferred esters are the esters of benzylpenicillin (penicillin G) and such esters will be more specifically referred to in the following, the penicillin residues in the compounds may, if desired, be those of other penicillins, for example penicillin O, K, F, dihydro-F and X as well as mixtures of various penicillins, for instance a mixture obtained by submersed cultivation of penicillin-producing microorganisms.

Generally, the compounds containing only one penicillin group in the molecule are to be preferred because of their better accumulation in the lungs.

It has been found that of the compounds defined above, those in which the Y group consists of or comprises alkylene of not more than 4 carbon atoms in a straight chain, the total number of carbon atoms in Y not exceeding 12, are of greater therapeutic value as compared with other compounds of the invention.

Thus, the group Y can be a methylene, an ethylene, a propylene or a butylene group, which may be substituted at one or more carbon atoms, if desired, with lower alkyl groups, such as methyl, ethyl or propyl.

Particularly good results in respect of lung accumulation have been obtained with compounds in which the Y group is a straight chain alkylene of 2 to 3 carbon atoms linked directly to the phenyl ring, but we have found that compounds in which the Y group is alkylene linked to the phenyl ring through oxygen, sulphur or a carbonyl, carboxy or carbamido group have also valuable antibiotic properties. Thus, the compounds of the invention may be anisols, when the alkylene group in Y is linked to the phenyl ring through oxygen, or thioanisols when the linkage is through sulphur. Further, the compounds are esters (thioesters) or amides (thiamides) if the Y group is alkylene linked through a carbonyl, thiocarbonyl, amido or thiamido group to the phenyl ring. Examples of such compounds of the invention are the penicillin esters of: p-diethylaminoethoxyphenol, p-hydroxybenzoic acid-diethylaminoethyl ester, p-hydroxybenzoic acid-diethylaminoethylamide, N - (p - hydroxyphenyl) - N' - (diethyl) - ethylenediamine, p - (N - β - diethylaminoacetyl)-aminophenol and the corresponding thioanisoles, thioesters and thiamides.

The linkage of the penicillin group to the phenyl ring may be in any of the ortho, meta and para positions. However, it appears that compounds, in which the penicillin group is linked to the phenyl ring in the para position, are of superior therapeutical value.

The $R^1$ and $R^2$ groups are preferably methyl or ethyl groups or groups which together with the nitrogen atom form a piperidine radical.

Our invention also comprises a method of producing esters of penicillin with phenols and thiophenols having a substituent containing a tertiary amino group as described hereinbefore, which method comprises reacting a phenol or thiophenol of the formula:

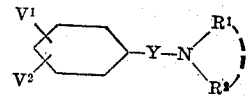

where $V^1$ is hydroxyl or sulphydryl and $V^2$ is hydrogen, hydroxyl or sulphydryl, and where Y, $R^1$ and $R^2$ have the above named significance, with penicillin anhydride or another reactive penicillin derivative. The reaction can be carried out in solution in an inert solvent in which both reactants are soluble. However, the reaction can also be carried out by adding the solid penicillin derivative to a solution of the phenol or thiophenol in an inert solvent or the solid phenol or thiophenol to a solution of the pencillin derivative.

The production of penicillin anhydride being difficult and involving great losses, we prefer to use as a reactive penicillin derivative a mixed anhydride of penicillin and a lower aliphatic monocarboxylic acid or an aromatic carboxylic acid, such as benzoic acid, or still more appropriate, a mixed anhydride of penicillin and a monoester of carbonic acid. Such mixed anhydrides are easily produced by reacting a penicillin salt with a chlorocarbonic acid ester in an inert solvent. Any stable salt of penicillin may be used, but we prefer to use penicillin salts with tertiary amines, such as the triethylamine or N-ethylpiperidine salt, or with metals, such as the sodium or potassium salt.

The solvents used in the process do not necessarily have to be such in which the reactants are soluble. In fact, we often use solvents in which one of the reactants is insoluble. By way of example, we may use methylene chloride, chloroform, ethyl acetate, acetone, ether, dioxan or tetrahydrofuran, single or mixed, and in the case of water-miscible solvents we may use aqueous solvents, when the latter are used, however, the water content should not exceed 30%. Such solvents are also suitable, when the mixed anhydride is reacted with the phenol or thiophenol and it is generally preferred to carry out this second reaction in direct continuation of the production of the mixed anhydride without isolating the latter.

The process of the invention is preferably carried out at low temperatures within the range of from −20° C. to +40° C. and a convenient and suitable temperature is approximately 0° C.

The production of the esters is best carried out in the presence of a basic catalyst. Thus, if a metal salt of penicillin is used, we prefer to add a small amount of an organic base, for instance triethylamine or pyridine, to the reaction mixture. For instance we may use 0.01 to 0.02% of pyridine (w./v.).

The esters may be isolated as such from the reaction mixture or they may be isolated as their acid addition salts with one of the above-mentioned acids innocuous to human beings. If the esters themselves are to be isolated, the reaction mixture may for example be washed with an aqueous solution of sodium bicarbonate and water, and dried over $MgSO_4$. The solvent may then be evaporated in vacuum, leaving the ester. When a salt is desired, a solution of the acid in question is added to the washed and dried reaction mixture, and the salt is then precipitated.

A number of biological tests were carried out with the compounds of the invention. In the following Table 1, figures are given illustrating the penicillin levels in the blood, lung, liver kidney and spleen of guinea pigs one and two hours after subcutaneous injection. The figures represent international units of penicillin and a comparison is made between compounds of the invention and the sodium and procaine salts of penicillin.

TABLE 1

| Derivative of benzylpenicillin | Dose | Hours after inj. | Blood, I.U. per cc. | Lung, I.U. per g. | Liver, I.U. per g. | Kidney, I.U. per g. | Spleen, I.U. per g. |
|---|---|---|---|---|---|---|---|
| Sodium salt | 50,000 | 1 | 26 | 35 | | | |
|  |  | 2 | 1.7 | 8.1 | | | |
| Procaine salt | 50,000 | 1 | 14 | 5.5 | | | |
|  |  | 2 | 5.9 | 1.9 | | | |
| 4-(β-diethylaminoethyl)-phenyl ester-citrate | 50,000 | 1 | 15 | 151 | 9.7 | 87 | 4.3 |
|  |  | 2 | 8.8 | 35 | 3.4 | 52 | 2.2 |
| 4-(β-piperidinoethyl)-phenyl ester-hydrochloride | 50,000 | 1 | 12 | 56 | 16 | 77 | 5.7 |
|  |  | 2 | | 66 | 4.9 | 37 | 3.7 |
| 4-(β-diethylaminoethoxy)-phenyl ester-citrate | 50,000 | 1 | 20 | 17 | 3.2 | 40 | 3.4 |
|  |  | 2 | 7.1 | 15 | 18 | 78 | 5.2 |
| 4-(ω-diethylaminoaceto)-phenyl ester-hydrobromide | 50,000 | 1 | 25 | 6.6 | 17 | 48 | 3.5 |
|  |  | 2 | 13 | 27 | 8.6 | 33 | 3.1 |
| 4-(N-methyl-N-diethylaminoethyl)-phenyl ester-dihydrochloride | 50,000 | 1 | 3.2 | 23 | 3.5 | 18 | 5.4 |
|  |  | 2 | 3.6 | 19 | 10 | 38 | 2.0 |
| 4-(β-diethylaminoethylthio-carbamido)-phenyl ester-citrate | 50,000 | 1 | 13 | 15.9 | 13.5 | 88 | 5.0 |
|  |  | 2 | 14 | 12.4 | 15.0 | 39 | 1.8 |
| 4-(β-diethylaminoethylcarb-oxamido) phenyl ester-citrate | 25,000 | 1 | 6.9 | 40 | 6.9 | 37 | 6.3 |
|  |  | 2 | 6.5 | 14.8 | 4.8 | 32 | 2.3 |
| 4-(ω-diethylaminoacetamino)-phenyl ester-hydrochloride | 25,000 | 1 | 3.9 | 20 | 11 | 101 | 5.4 |
|  |  | 2 | 8.8 | 12 | 3.6 | 14 | 1.5 |
| 3-(ω-diethylaminoacetamino)-phenyl ester hydrochloride | 50,000 | 1 | 3.5 | 53 | 10 | 49 | 2.3 |
|  |  | 2 | 7.9 | 30 | 10 | 124 | 4.4 |
| 4-(λ-diethylaminopropyl)-phenyl ester-citrate | 50,000 | 1 | 13 | 37 | 18 | 38 | 3.9 |
|  |  | 2 | 7.6 | 13 | 4.9 | 20 | 3.1 |
| 4-(β-diethylaminopropyl)-phenyl ester-citrate | 50,000 | 1 | 5.9 | 53 | 8.7 | 36 | 4.4 |
|  |  | 2 | 17 | 22 | 11 | 34 | 2.4 |
| 4-(β-dimethylaminoethyl)-phenyl ester-citrate | 50,000 | 1 | 7.7 | 39 | 1.3 | 11 | 4.7 |
|  |  | 2 | 4.1 | 28 | 3.6 | 19 | 5.5 |
| 2-(β-diethylaminoethyl)-phenyl ester-hydrobromide | 50,000 | 1 | 4.9 | 59 | 10 | 46 | 4.2 |
|  |  | 2 | 10 | 31 | 7.1 | 30 | 3.4 |
| 3-(β-diethylaminoethyl)-phenyl ester-citrate | 50,000 | 1 | 9.2 |  |  |  |  |

In a further experiment the protracted effect of one of the compounds of the invention, the citrate of benzylpenicillin-4-(β-diethylaminoethyl)phenyl ester (I in Table 2), was compared with that of benzylpenicillin-diethylaminoethyl ester-hydriodide (II), of the sodium salt (III) and of the procaine salt (IV). These substances were injected subcutaneously in guinea pigs in doses of 50,000 I.U. per animal, and the penicillin level in the blood and lungs was determined at intervals after the injection. The results are given in Table 2, where the figures represent I.U. per cc. of blood and per g. of lung.

TABLE 2

| Hours after inj. | I | | II | | III | | IV | |
|---|---|---|---|---|---|---|---|---|
|  | Blood | Lung | Blood | Lung | Blood | Lung | Blood | Lung |
| ½ | 16 | 197 | 16 | 90 | 73 | 35 | 17 | 5.6 |
| 1 | 13 | 108 | 9.0 | 38 | 26 | 8.1 | 14 | 5.5 |
| 2 | 8.4 | 40 | 5.9 | 11 | 1.7 | 0.7 | 5.9 | 1.9 |
| 3 | 8.5 | 23 |  |  | 0.5 | 0.3 |  |  |
| 4 | 3.3 | 5.3 | 2.9 | 2.8 | 0.1 | 0.4 | 2.1 | 1.7 |
| 5 | 1.7 | 2.3 |  |  | 0.1 | 0.07 |  |  |
| 6 | 1.9 | 2.8 | 1.2 | 1.3 |  |  | 2.2 | 1.0 |

The table shows that the compound of the invention gives a higher accumulation in the lung and a more protracted effect than any of the other penicillin compounds.

In Table 2 the figure given for compounds I and II represent "total penicillin," i. e. both free penicillin and the penicillin ester. The higher the proportion of free penicillin to the penicillin ester is, the greater is the antibiotic activity. In a further experiment the distribution between free penicillin and penicillin as the ester was determined. Monkeys were injected intramuscularly with a dose of 50,000 I. U. per kilogram body weight of the compounds I and II referred to above, and the sodium salt of penicillin, and the penicillin levels in the blood (I. U. per cc.) and lungs (I. U. per g.) were determined 2 hours after the injection together with the distribution between free penicillin and penicillin ester. The results are given in Table 3.

TABLE 3

| Compound | Blood | | | Lung | | |
|---|---|---|---|---|---|---|
| | Total penicillin | Penicillin ester | Free penicillin | Total penicillin | Penicillin ester | Free penicillin |
| I | 4.8 | 0.6 | 4.0 | 71 | 7.3 | 51 |
| II | 7.2 | 3.7 | 4.6 | 8.0 | 3.0 | 2.8 |
| Sodium salt | 4.3 | | 4.3 | 1.8 | | 1.8 |

Further, the sensitivity of a number of bacteria strains to the sodium salt of penicillin and to the above compound I of the invention was determined in dilution series.

Due to the slow liberation of free penicillin from compound I it was to be expected when using this technique that sodium penicillinate would have about twice the activity of compound I. This was also apparent in most of the experiments. However, it was found that penicillin-resistant, penicillinase-producing strains of *Micrococcus pyogenes* v. *aureus* were more sensitive to compound I than to sodium penicillinate.

The microorganisms were all highly virulent resistant micrococci isolated from patients. The figures in Table 4 give the concentration of penicillin in I. U. per cc., which gives 50% inhibition.

TABLE 4

| Strain No. | Penicillin concentration | |
|---|---|---|
| | Sodium salt | Compound I |
| CJ (non resistant) | 0.03 | 0.06 |
| CJ 5 (resistant) | 185 | 36 |
| CJ 6 (resistant) | 185 | 24 |
| CJ 7 (resistant) | 185 | 48 |
| CJ 8 (resistant) | 16 | 8 |
| CJ 9 (resistant) | 250 | 185 |
| CJ 10 (resistant) | 8 | 6 |
| CJ 11 (resistant) | 185 | 62 |

The following examples illustrate preferred methods of producing the compounds of the invention, but are in no manner to be considered limiting to the scope as defined in the claims.

*Example 1*

18.6 g. (1/20 mole) of the potassium salt of benzylpenicillin are suspended in 100 ccs. of methylene chloride containing 4.8 ccs. of ethyl chlorocarbonate (1/20 mole). The mixture is cooled in ice and 2 ccs. of a 1% solution of pyridine in methylene chloride are added. The mixture is left standing with stirring for 30 minutes. Then, a solution of 9.65 g. of 4-(β-diethylaminoethyl)-phenol in 40 ccs. of methylene chloride is added in one portion. After further standing for 30 minutes, the precipitated potassium chloride is filtered off, and a solution of 5.25 g. (1/40 mole) of citric acid-monohydrate in 100 ccs. of butanol is added to the filtrate, whereafter the methylene chloride is evaporated in vacuum. Then, a further 5.25 g. of citric acid-monohydrate in 100 ccs. of butanol are added, precipitating 28–29 g. of benzylpenicillin-4-(β-diethylaminoethyl)phenyl ester-citrate with a purity of 95–100% and a melting point of 80° C. (dec.). $(\alpha)_D^{20} = +136°$ C. (c.=2.5% in water).

In the above example ethyl chlorocarbonate may be replaced by the equivalent amount of other acid chlorides as specified below, whereby the specified yields of benzylpenicillin-4-(β-diethylaminoethyl)phenyl ester-citrate (purity 95–100%) are obtained:

| | Percent |
|---|---|
| Methyl chlorocarbonate | 57 |
| n-Propyl-chlorocarbonate | 73 |
| n-Butyl chlorocarbonate | 72 |
| Iso-butyl chlorocarbonate | 72 |
| n-Hexyl chlorocarbonate | 77 |
| Trimethylacetyl chloride | 62 |
| Diphenylacetyl chloride | 59 |
| α-Ethylhexanoic acid chloride | 57 |
| Benzoyl chloride | 70 |

*Example 2*

18.6 g. of the potassium salt of benzylpenicillin are suspended in 100 ccs. of methylene chloride containing 4.8 ccs. of ethyl chlorocarbonate. The mixture is cooled in ice and 2 ccs. of a 1% solution of pyridine in methylene chloride are added. After stirring for 30 minutes, 9.65 g. of 4-(β-diethylaminoethyl)phenol are added. After further 30 minutes, the reaction mixture is washed with 200 ccs. of 2% sodium bicarbonate solution, whereafter the methylene chloride phase is dried over magnesium sulphate. Methylene chloride is evaporated in vacuum, and the residue is dissolved in 150 ccs. of methylisobutylketone, whereafter a solution of 7.5 g. of lactic acid in 30 ccs. of methylisobutylketone is added. The precipitated crystals weigh 20.1 g., and the mother liquor may further yield 2.6 g., making a total of 22.7 g. of benzylpenicillin-4-(β-diethylaminoethyl)phenyl ester-lactate, corresponding to 75% of the theoretical yield. The purity is 100% and $(\alpha)_D^{20} = +168°$ (c.=2% in water).

If methylene chloride is replaced by trichlorethylene and ethyl chlorocarbonate by the equivalent amount of benzoyl chloride in the above example, benzylpenicillin-4-(β-diethylaminoethyl)phenyl ester-lactate is obtained in a yield of 60% of the theoretical.

If the potassium salt of the above example is replaced by 17.8 g. of the sodium salt and if methylethyl ketone is used as a reaction medium instead of methylene chloride, a yield of 15.6 g. of benzylpenicillin-4-(β-diethylaminoethyl)phenyl ester-lactate is obtained, corresponding to 50% of the theoretical.

*Example 3*

18.6 g. of the potassium salt of benzylpenicillin are suspended in 100 ccs. methylisobutylketone. The suspension is cooled to 0° C., and 4.8 ccs. of ethyl chlorocarbonate and then 2 ccs. of a 1% solution of pyridine in methylisobutylketone are added. The mixture is left standing with stirring for 1 hour, whereafter 9.65 g. of 4-(β-diethylaminoethyl) phenol are added. After a reaction period of 30 minutes the reaction mixture is washed with 200 ccs. of 2% sodium bicarbonate solution. The methylisobutylketone phase is dried over $MgSO_4$. To the dried solution 7.5 g. of lactic acid dissolved in 30 ccs. of methylisobutylketone are added. After standing at 0° C. for 2 hours, 19.6 g. of benzylpenicillin-4-(β-diethylaminoethyl)phenyl ester-lactate, corresponding to 65% of the theoretical, are filtered off.

By replacing ethyl chlorocarbonate with the equivalent amount of benzoyl chloride in the above example, a yield of 16.5 g. of benzylpenicillin-4-(β-diethylaminoethyl)phenyl ester-lactate is obtained, corresponding to 55% of the theoretical.

Example 4

3.72 g. of the potassium salt of penicillin are suspended in 75 ccs. of methylene chloride, and 0.96 ccs. of ethyl chlorocarbonate in 20 ccs. of methylene chloride are added. The mixture is cooled to 0° C., and 0.02 g. of pyridine in 2 ccs. of methylene chloride are added. After stirring for 30 minutes, a solution of 2.9 g. of 4-γ-diethylamino propyl)-phenol-hydrobromide and 1.40 ccs. of triethylamine in 50 ccs. of methylene chloride is added. After standing at 0° C. for 2 hours the solution is washed with a saturated solution of sodium bicarbonate and water, whereafter the methylene chloride phase is dried over MgSO₄. After removal of MgSO₄ by filtration, 50 ccs. of isopropanol and 2.1 g. of citric acid-monohydrate dissolved in 20 ccs. of acetone are added. On addition of 100 ccs. of ether benzylpenicillin-4-(α-diethyllaminopropyl)phenyl ester-citrate crystallizes. The yield is 70% having purity corresponding to 755 I. U./mg. and the melting point is 95° C. (dec.).

In analogous manner benzylpenicillin-4-(β-diethylaminopropyl)phenyl ester-citrate is produced from 4-(β-diethylaminopropyl phenol-hydrobromide as an amorphous powder with a purity of 654 I. U./mg.

From 2.72 g. of 3-(β-diethylaminoethyl)phenol-hydrobromide the citrate of benzylpenicillin-3-(β-diethylaminoethyl)phenyl ester is obtained as a white crystalline substance with a purity of 664 I.U./mg. and a melting point of 89–91° C. (dec.) in a yield of 65% of the theoretical.

From 2.72 g. of 2-(β-diethylaminoethyl)-phenol-hydrobromide, the citrate of benzylpenicillin-2-(β-diethylaminoethyl)phenyl ester is obtained as an amorphous powder. This is dissolved in water and the hydrobromide is precipitated on addition of an aqueous solution of potassium bromide. The aqueous phase is decanted, the precipitated viscous oil is dissolved in 75 ccs. of methylene chloride and the solution is dried over MgSO₄. After filtration, 200 ccs. of ether are added whereby benzylpenicillin-2-(β-diethylaminoethyl)phenyl ester-hydrobromide is precipitated as an amorphous light-yellow powder in a purity of 694 I. U./mg. the yield being 35%.

Analogous 4-hydroxy-ω-diethylaminnoacetophenonehydrochloride yields benzylpenicillin-4-(ω-diethylaminoacetophenyl ester-hydrobromide in a purity of 950 I. U./mg.

Example 5

4.46 g. of the N-ethylpiperidine salt of benzylpenicillin are dissolved in 100 ccs. of methylene chloride, and the solution is cooled to 0° C., whereafter 0.96 ccs. of ethyl chlorocarbonate are added. After standing at 0° C. for 30 minutes, a solution of 2.6 g. 4-hydroxy-ω-diethylaminoacetanilide-hydrochloride and 1.4 ccs. of triethylamine in 50 ccs. of methylene chloride is added. After standing for 1 hour at 0° C. the mixture is left standing overnight at room temperature. The solution is then washed with a saturated solution of sodium bicarbonate and water and dried over MgSO₄. The latter is filtered off and 2.1 g. of citric acid-monohydrate in 20 ccs. of acetone are added. On addition of ether, benzylpenicillin-4-(ω-diethylaminoacetamino phenyl ester-citrate is precipitated as an amphorous powder. This amorphous citrate has a purity of 662 I. U./mg. and the yield is 45% of the theoretical.

In analogous manner 2.72 g. of N-diethylaminoethyl-4-hydroxybenzamide-hydrochloride gives benzylpenicillin-4-(ω-diethylaminoethyl-carboxyamido)phenyl ester-citrate in a yield of 30% and with a purity of I. U./mg.

Example 6

3.72 g. (1/100 mole) of the potassium salt of benzylpenicillin are suspended in 75 ccs. of methylene chloride, and 0.96 ccs. of ethyl chlorocarbonate dissolved in 20 ccs. of methylene chloride are added. The mixture is cooled to 0° C., and 0.02 g. of pyridine in 2 ccs. of methylene chloride are added. The mixture is left standing with stirring at 0° C. for 30 minutes, whereafter a solution of 3.4 g. of 4-(N-methyl-N-diethylaminoethyl)aminophenol-hydrochloride-hydrobromide and 2.8 ccs. of triethylamine in 100 ccs. of methylene chloride is added. The mixture is left at 0° C. for 2 hours, whereafter it is washed with sodium bicarbonate solution and water. After drying over MgSO₄, the equivalent amount of an ethanolic solution of hydrogen chloride is added. The resulting solution is precipitated with 200 ccs. of ether, and the precipitated dihydrochloride is reprecipitated from ethanol-ether, whereby benzylpenicillin-4-(N-methyl-N-diethylaminoethyl aminophenyl ester-dihydrochloride is obtained as an amorphous powder. The purity is 915 I. U./mg. and the yield is 70% of the theoretical.

Example 7

3.72 g. of the potassium salt of benzylpenicillin are suspended in 75 ccs. of methylene chloride. Then 0.96 cc. of ethyl chlorocarbonate dissolved in 20 ccs. of methylene chloride are added. The mixture is cooled to 0° C., and 0.02 g. of pyridine in 2 ccs. of methylene chloride are added, whereafter the mixture is left standing with stirring at 0° C. for 30 minutes. Then 2.22 g. (1/100 mole) of 2-hydroxy-ω-diethylaminoacetanilide are added, and the mixture is left standing with stirring for 4 hours. After washing with sodium bicarbonate solution and water, the solution is dried over MgSO₄. Then, 2.1 g. of citric acid-monohydrate dissolved in 20 ccs. of acetone are added, whereafter the amorphous citrate is precipitated by addition of ether. The citrate is filtered off and dissolved in water, and the amorphous hydrobromide is precipitated by addition of a surplus of an aqueous potassium bromide solution. The water is decanted off, and the hydrobromide is dissolved in 50 ccs. of methylene chloride. The solution is dried over MgSO₄ and the precipitated with ether. Thereby benzylpenicillin-2-(ω-diethylaminoacetamino)phenyl ester-hydrobromide is obtained as an amorphous powder. The purity is 930 I. U./mg.

Example 8

3.72 g. of the potassium salt of benzylpenicillin are suspended in 75 ccs. of methylene chloride, and 0.96 cc. of ethyl chlorocarbonate in 20 ccs. of methylene chloride are added. The mixture is cooled to 0° C., and 0.02 g. of pyridine in 2 ccs. of methylene chloride are added. After stirring for 30 minutes, 2.22 g. of 3-hydroxy-ω-diethylaminoacetanilide are added. The mixture is left standing for 3 hours with stirring and then washed with sodium bicarbonate solution and water. After drying with MgSO₄, the equivalent amount of ethanolic hydrogen chloride is added. On addition of ether, an amorphous hydrochloride is precipitated which is then re-precipitated from ethanol-ether. Thereby, benzylpenicillin - 3 - (ω - diethylaminoacetamino)phenyl ester-hydrochloride is obtained as an amorphous powder with a purity of 1060 I. U./mg.

In an analogous manner 2.52 g. of N-diethylaminoethyl-4-hydroxythiobenzamide gives benzylpenicillin-4-(N-diethylaminoethylthiocarbamido)phenyl ester-hydrochloride as an amorphous yellowish powder with a purity of 937 I. U./mg.

Example 9

1.86 g. (1/200 mole) of the potassium salt of benzylpenicillin are dissolved in 45 ccs. of methylene chloride, and 0.48 cc. of ethyl chlorocarbonate dissolved in 5 ccs. of methylene chloride are added. After cooling to 0° C., 1 cc. of pyridine in methylene chloride (1%) is added. After stirring for 30 minutes, 1.025 g. of 4-(β-piperidinoethyl)phenol dissolved in 100 ccs. of acetone are added. After a reaction period of ½ hour, the reaction mixture is washed with sodium bicarbonate solution and water and dried over MgSO₄. After filtration, the solution is evaporated in vacuum, and the residue is dissolved in isopropanol and titrated with ethanolic hydrogen chloride. On addition of ether, benzylpenicillin - 4 - (β-piperidinoethyl)phenyl ester-hydrochloride crystallizes in a yield of 0.62 g. The melting point is 163–167° C. and the purity 1087 I. U./mg.

In an analogous manner benzylpenicillin-4-(β-morpholinoethyl)phenyl ester-hydrochloride is obtained with melting point 166–73° C. and purity 1055 I. U./mg.

Example 10

To a solution of 1/200 mole of the mixed anhydride of benzylpenicillin and ethylcarbonic acid, prepared as in Example 9, 0.82 g. of 4-(β-dimethylaminoethyl)phenol dissolved in 25 ccs. of acetone are added. After two hours, the methylene chloride solution is washed with a solution of sodium bicarbonate and with water and dried over MgSO$_4$. After filtration, the solution is evaporated in vacuum and the residue is dissolved in dry acetone, whereafter the calculated amount of citric acid dissolved in acetone is added. Thereby, 1.5 g. of benzylpenicillin-4-(β-dimethylaminoethyl)phenyl ester-citrate crystallizes. By re-crystallization from ethanol-ether 0.82 g. of crystals with a purity of 718 I. U./mg. are obtained.

Example 11

1/100 mole of the mixed anhydride of benzylpenicillin and ethylcarbonic acid is prepared as described in Example 9, whereafter 2.49 g. of 4-(β-dibutylaminoethyl)-phenol dissolved in 32 ccs. of methylene chloride are added. After 1 hour, the methylene chloride solution is washed and dried as described in the preceding example. After evaporation in vacuum, the residue is dissolved in 50 ccs. of isopropanol, and the solution is titrated with a solution of sulphuric acid in isopropanol. On precipitation with ether, 1.97 g. of benzylpenicillin-4-(β-dibutylaminoethyl)phenyl ester-sulphate are obtained as an amorphous yellow powder with a purity of 710 I. U./mg.

Example 12

To 1/200 mole of the mixed anhydride of benzylpenicillin and ethylcarbonic acid in methylene chloride are added 895 g. of 4-diethylaminoethylphenol dissolved in 30 ccs. of methylene chloride. After 1 hour, the calculated amount of citric acid dissolved in acetone is added. On addition of ether, 1.7 g. of benzylpenicillin-4-diethylaminoethylphenyl ester-citrate with a purity of 437 I. U./mg. are precipitated. The citrate is dissolved in water, and the sparingly soluble hydriodide is precipitated by addition of an aqueous solution of potassium iodide. The precipitate is stirred with ethanol-ether, whereby 0.8 g. of amorphous benzylpenicillin-4-diethylaminoethylphenyl ester-hydriodide are obtained, having a purity of 724 I. U./mg.

Example 13

0.02 mole of the mixed anhydride of penicillin and ethylcarbonic acid are prepared as described in the previous examples. A solution of 0.01 mole of 3.5-dihydroxydiethylaminoacetanilide in 20 ccs. of acetone and 0.01 mole of triethylamine is added, whereafter the mixture is left overnight at 0° C. After washing with water, sodium bicarbonate solution and water, the solution is dried over MgSO$_4$ and then evaporated in vacuum. The residue is dissolved in anhydrous ethanol, and the equivalent amount of hydrogen chloride in ethanol is added. On addition of ether, the hydrochloride is precipitated in amorphous form. By re-precipitation from methanol-ether, the hydrochloride is obtained in crystalline form, the melting point being 120° C. (dec.).

Example 14

0.02 mole of the mixed anhydride of penicillin and ethylcarbonic acid are prepared in the usual manner. 1.95 g. (0.01 mole) of 5-diethylaminomethylresorcinol suspended in 25 ccs. of methylene chloride are added, and the mixture is left at 0° C. for 2 hours with stirring and then overnight at the same temperature. After washing with water, NaHCO$_3$-solution and water and drying over MgSO$_4$, the methylene chloride is evaporated in vacuum. The residue is dissolved in anhydrous ethanol, whereafter hydrogen chloride in ethanol is added, until pH is about 4. The solution is poured into ether, whereby the amorphous hydrochloride is obtained. On re-precipitation from methanol-ether, the hydrochloride is obtained as an amorphous powder with a purity of 867 I. U./mg.

Example 15

8.72 g. (0.02 mole) of the triethylamine salt of benzylpenicillin are dissolved in 100 ccs. of methylene chloride, whereafter the solution is cooled to 0° C. 2.4 ccs. (0.025 mole) of ethyl chlorocarbonate are added and the mixture is left at 0° C. for ½ hour.

2.90 g. (0.01 mole) of 4-diethylaminomethylresorcinol-hydrochloride and 3.5 ccs. (0.025 mole) of triethylamine are dissolved in 30 ccs. of methylene chloride, the solution is cooled to 0° C. and added to the above described solution. The mixture is left at room temperature for 3 hours and then washed with water, sodium bicarbonate solution and water and dried over MgSO$_4$. After evaporation in vacuum, the residue is extracted with ether, the ethereal extract is filtered and the filtrate is evaporated to a syrup. This is dissolved in acetone, and the calculated amount of a 0.5 molar solution of citric acid in acetone is added. The amorphous citrate is precipitated on pouring the acetone solution into ether. It can be re-precipitated from ethanol-ether. The purity is 1044 I. U./mg.

Example 16

To 9 g. of the triethylamine salt of benzylpenicillin dissolved in 20 ccs. of chloroform, a solution of 2 ccs. of ethyl chlorocarbonate in 20 ccs. of chloroform is added at 0° C. After standing for 10 minutes, a solution of 3.6 g. of p-(β-diethylaminoethyl)phenol in 20 ccs. of chloroform is added whereafter the mixture is placed overnight at 0° C. After washing with water, sodium bicarbonate solution and again with water the chloroform phase is dried over magnesium sulphate and then evaporated in vacuum. The residue is dissolved in 50 ccs. of acetone whereafter 4 g. of citric acid dissolved in 40 ccs. of acetone are added. Thereby the crystalline benzylpenicillin-4-(β-diethylaminoethyl)phenyl ester-citrate is obtained and, after recrystallization from 50 ccs. of ethanol, the yield is 8 g. The purity of the substance is 710 I. U./mg. and the substance is decomposed on heating to about 80° C.

Example 17

To a solution of 21.75 g. of the triethylamine salt of benzylpenicillin in 50 ccs. of chloroform a solution of 5.43 g. of ethyl chlorocarbonate in 50 ccs. of chloroform is added at 0° C. After standing for 10 minutes, a solution of 10.5 g. of p-β-diethylaminoethoxyphenol in 50 ccs. of chloroform is added. The mixture is left overnight at 0° C. and is then worked up as in Example 16. The yield is 15 g. of the crystalline benzylpenicillin-4-(β-diethylaminoethoxy)phenyl ester-citrate with a purity of 715 I. U./mg. The substance decomposes on heating to a temperature of 95° C.

Example 18

To a suspension of 42.0 g. of the sodium salt of benzylpenicillin in 300 ccs. of dry acetone are added 10 drops of dry pyridine and then 11.4 ccs. of ethyl chlorocarbonate. The mixture is stirred at 0° C. for 1 hour. Then, 26.0 g. of p-hydroxybenzoic acid-diethylaminoethyl ester are added, whereafter the reaction mixture is left for 12 hours at 0° C. The precipitated sodium chloride is filtered off, and the solution of 25.0 g. of citric acid monohydrate in 250 ccs. of acetone is added to the filtrate. Thereby, the citrate of the benzylpenicillin ester of p-hydroxybenzoic acid-diethylaminoethyl ester crystallizes out. The yield is 75 g. or 85% of the theoretical. The purity is 695 I. U./mg. and the melting point is 100° C. (dec.).

*Example 19*

To a solution of 0.02 mole of the mixed anhydride of benzylpenicillin and ethylcarbonic acid in methylene chloride are added 4.9 g. of 2-(diethylaminomethyl)thiophenol. After standing for 1 hour, the mixture is washed with a saturated solution of sodium bicarbonate. The methylene chloride phase is dried over magnesium sulhate and evaporated to a small volume. On addition of petrol ether, a syrup is precipitated which crystallizes on standing. By re-precipitation from ether-petrol ether, pure benzylpenicillin-2-(diethylaminomethyl)thiophenyl ester is obtained with melting point 141–42° C. and $(\alpha)_D^{20} = +177°$ (in acetone).

*Example 20*

To 4.35 g. of the triethylamine salt of benzylpenicillin dissolved in 30 ccs. of dry methylene chloride are added 1.085 g. of ethyl chlorocarbonate at 0° C. After 15 minutes, a mixture of 2.76 g. of 4-(diethylaminoacetamino)thiophenolhydrochloride and 0.79 g. of pyridine in 20 ccs. of methylene chloride is added. After standing for 2 hours at 0° C., the mixture is washed with an aqueous solution of sodium bicarbonate. The methylene chloride phase is dried (MgSO$_4$) and evaporated in vacuum to a syrup. This is dissolved in 50 ccs. of isopropanol, and the solution is titrated with hydrogen chloride in ethanol. On addition of ether, benzylpenicillin-4-(diethylaminoacetamino)-thiophenyl ester-hydrochloride is obtained as an amorphous, hygroscopic powder.

Analogous thiosalicylic acid-diethylaminoethyl ester gives benzylpenicillin-2-(carbo-β-diethylaminoethoxy)thiophenyl ester-hydrochloride in a yield of 70% of the theoretical. The melting point is 135–36° C.

We claim:

1. Esters of penicillin with phenols having a basic substituent, said esters being represented by the formula:

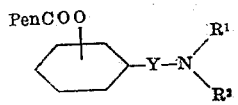

where PenCO represents penicillin with hydroxyl removed from the carboxyl group; where Y is alkylene of not more than 4 carbon atoms in a straight chain, the total number of carbon atoms in Y not exceeding 12; and where R$^1$ and R$^2$ are alkyl groups of not more than 4 carbon atoms each.

2. Esters of penicillin with thiophenols having a basic substituent, said esters being represented by the formula:

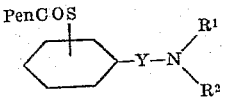

where PenCO represents penicillin with hydroxyl removed from the carboxyl group; where Y is alkylene of not more than 4 carbon atoms in a straight chain, the total number of carbon atoms in Y not exceeding 12; and where R$^1$ and R$^2$ are alkyl groups of not more than 4 carbon atoms each.

3. Esters of penicillin with phenols having a basic substituent, said esters being represented by the formula:

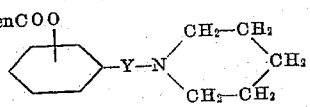

where PenCO represents penicillin with hydroxyl removed from the carboxyl group; and where Y is alkylene of not more than 4 carbon atoms in a straight chain, the total number of carbon atoms in Y not exceeding 12.

4. Esters of penicillin with thiophenols having a basic substituent, said esters being represented by the formula:

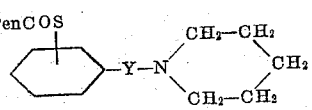

where PenCO represents penicillin with hydroxyl removed from the carboxyl group; and where Y is alkylene of not more than 4 carbon atoms in a straight chain, the total number of carbon atoms in Y not exceeding 12.

5. Benzylpenicillin - (β - diethylaminoethyl) - phenyl ester.

6. Benzylpenicillin - 4 - (β - dimethylaminoethyl) - phenyl ester.

7. Benzylpenicillin-4-(β-piperidinoethyl)-phenyl ester.

References Cited in the file of this patent

UNITED STATES PATENTS 2,694,031   Fredericksen et al. ——————— Nov. 9, 1954

OTHER REFERENCES

Carpenter: "J. Am. Chem. Soc.," vol. 70 (1948), pp. 2964–66.